United States Patent
Nedachi et al.

(10) Patent No.: US 8,272,994 B2
(45) Date of Patent: Sep. 25, 2012

(54) CLUTCH CONTROL DEVICE

(75) Inventors: Yoshiaki Nedachi, Saitama (JP);
Yoshiaki Tsukada, Saitama (JP);
Takashi Ozeki, Saitama (JP); Hiroyuki Kojima, Saitama (JP); Kazuyuki Fukaya, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 896 days.

(21) Appl. No.: 12/370,957

(22) Filed: Feb. 13, 2009

(65) Prior Publication Data

US 2009/0247362 A1 Oct. 1, 2009

(30) Foreign Application Priority Data

Mar. 28, 2008 (JP) ................................. 2008-088032

(51) Int. Cl.
*B60W 10/02* (2006.01)
*B60W 10/04* (2006.01)
(52) U.S. Cl. ........................... 477/175; 477/60; 477/124
(58) Field of Classification Search ..................... 74/330, 74/339, 340, 732.1, 733.1; 192/3.58, 3.61, 192/3.63, 13 R, 219, 221; 477/59–60, 70–71, 477/74–75, 77, 79–80, 83–84, 94, 124, 166, 477/170–172, 174–175, 180, 184; 701/67–68
See application file for complete search history.

(56) References Cited

U.S. PATENT DOCUMENTS

| | | | | |
|---|---|---|---|---|
| 4,817,776 A | * | 4/1989 | Tateno et al. | 477/78 |
| 4,899,858 A | * | 2/1990 | Cote et al. | 477/83 |
| 5,337,868 A | * | 8/1994 | Liu et al. | 477/74 |
| 5,393,274 A | * | 2/1995 | Smedley | 477/74 |
| 6,022,295 A | * | 2/2000 | Liu | 477/180 |
| 6,427,550 B1 | * | 8/2002 | Bowen | 74/336 R |
| 7,158,873 B2 | * | 1/2007 | Eich et al. | 701/68 |
| 2002/0074201 A1 | * | 6/2002 | Suzuki et al. | 192/13 R |
| 2007/0199395 A1 | * | 8/2007 | Ochi et al. | 74/335 |
| 2010/0204010 A1 | * | 8/2010 | Petzold et al. | 477/174 |

FOREIGN PATENT DOCUMENTS

| | | |
|---|---|---|
| EP | 0 550 222 A2 | 7/1993 |
| EP | 0 550 222 A3 | 7/1993 |
| EP | 0 635 391 A2 | 1/1995 |
| EP | 0 635 391 A3 | 1/1995 |
| JP | 2004-197842 | 7/2004 |

\* cited by examiner

*Primary Examiner* — Justin Holmes
*Assistant Examiner* — Huan Le
(74) *Attorney, Agent, or Firm* — Squire Sanders (US) LLP

(57) ABSTRACT

An apparatus includes a clutch control unit to control a control amount of a clutch and a brake to temporarily stop an output side rotating body while the clutch is disconnected. A clutch-control-amount detector detects the control amount of the clutch and an engagement start detector detects an engagement start of the clutch when a rotational speed difference between the input side rotating body and the output side rotating body becomes equal to or less than a predetermined value. An engagement-start control-amount detector detects the control amount of the clutch in the engagement start and a clutch-correction-control-amount deriver derives a correction control amount of the clutch based on the control amount of the clutch at the time when the engagement start is detected after the output side rotating body is temporarily stopped. The clutch control unit feedback-controls the control amount of the clutch based on the correction control amount.

24 Claims, 9 Drawing Sheets

CLUTCH CONTROL DEVICE

FIELD

Some of the embodiments relate to a clutch control device, and, more particularly, relates to a clutch control device to detect an engagement start of a clutch by measuring rotational speeds of an input side rotating body and an output side rotating body of the clutch.

BACKGROUND

A clutch device has been known conventionally to transmit a rotational driving force of a power source to a drive wheel by a frictional force of a friction plate (clutch plate) which is drive-controlled by an actuator. In such a clutch device, for example, when the clutch plate is worn out and becomes thin, the same frictional force may not be acquired even if a drive amount of the actuator is the same as before. Such a problem can be solved by, for example, detecting a movement amount required for clutch plates, which are apart from each other, to come into contact with each other, and by increasing the drive amount of the actuator in accordance with an increase of this movement amount.

Japanese Patent Application Publication No. 2004-197842 (Japan '842) generally discusses a structure in which a movement amount required for clutch plates to come into contact with each other is detected on the basis of a position of a member displaced by an actuator.

However, in the structure discussed in Japan '842, since a wearing degree of the clutch plates is estimated on the basis of the drive amount of the actuator, it has been impossible to detect a change of the frictional force caused by changed friction characteristics of the clutch plates or changed characteristics of an oil which lubricates the clutch. Meanwhile, in a structure in which a pressing force for connecting a clutch is obtained not by an elastic member, such as a clutch spring, but by a frictional force of an actuator and an oil pressure controlled by the actuator, the frictional force is changed especially by the pressing force after clutch plates come into contact with each other. Therefore, in order to perform more suitable clutch control, there has been a demand on detecting timing at which the clutch actually starts to be engaged.

SUMMARY

According to one embodiment, a clutch control device can be provided for a clutch. The clutch may connect and disconnect a rotational driving force transmitted to a drive wheel from a power source of a vehicle. The clutch can also include an input side rotating body and an output side rotating body which may synchronously rotate with the clutch being connected. The clutch control device may include an input side rotational speed detection means that can detect a rotational speed of the input side rotating body. The clutch control device may include an output side rotational speed detection means that can detect a rotational speed of the output side rotating body. The clutch control device may include a clutch control means that can control a control amount of the clutch. The clutch control device may include a brake means that can temporarily stop the output side rotating body while the clutch is disconnected. The clutch control device may include a clutch-control-amount detection means that can detect the control amount of the clutch. The clutch control device may include an engagement start detection means that can detect an engagement start of the clutch when a rotational speed difference between the input side rotating body and the output side rotating body becomes equal to or less than a predetermined value. The clutch control device may include an engagement-start control-amount detection means that can detect the control amount of the clutch in the engagement start. The clutch control device may include a clutch-correction-control-amount deriving means that can derive a correction control amount of the clutch based on the control amount of the clutch at the time when the engagement start is detected after the output side rotating body is temporarily stopped. The clutch control means can feedback-control the control amount of the clutch based on the correction control amount.

According to another embodiment, a clutch control apparatus may be provided for a clutch. The clutch may connect and disconnect a rotational driving force that can be transmitted to a drive wheel from a power source of a vehicle. The clutch may include an input side rotating body and an output side rotating body which can synchronously rotate with the clutch being connected. The clutch control apparatus may include an input side rotational speed detector that can detect a rotational speed of the input side rotating body. The clutch control apparatus may include an output side rotational speed detector that can detect a rotational speed of the output side rotating body. The clutch control apparatus may include a clutch control unit that can control a control amount of the clutch. The clutch control apparatus may include a brake that can temporarily stop the output side rotating body while the clutch is disconnected. The clutch control apparatus may include a clutch-control-amount detector that can detect the control amount of the clutch. The clutch control apparatus may include an engagement start detector that can detect an engagement start of the clutch when a rotational speed difference between the input side rotating body and the output side rotating body becomes equal to or less than a predetermined value. The clutch control apparatus may include an engagement-start control-amount detector that can detect the control amount of the clutch in the engagement start. The clutch control apparatus may include a clutch-correction-control-amount deriver that can derive a correction control amount of the clutch based on the control amount of the clutch at the time when the engagement start is detected after the output side rotating body is temporarily stopped. The clutch control unit can feedback-control the control amount of the clutch based on the correction control amount.

According to another embodiment, a clutch control method may be provided for a clutch. The clutch may connect and disconnect a rotational driving force transmitted to a drive wheel from a power source of a vehicle. The clutch can include an input side rotating body and an output side rotating body which may synchronously rotate with the clutch being connected. The clutch control method may detect, at an input side rotational speed detector, a rotational speed of the input side rotating body. The clutch control method may detect, at an output side rotational speed detector, a rotational speed of the output side rotating body. The clutch control method may control, by a clutch control unit, a control amount of the clutch. The clutch control method may temporarily stop, using a brake, the output side rotating body while the clutch is disconnected. The clutch control method may detect, at a clutch-control-amount detector, the control amount of the clutch. The clutch control method may detect, at an engagement start detector, an engagement start of the clutch when a rotational speed difference between the input side rotating body and the output side rotating body becomes equal to or less than a predetermined value. The clutch control method may detect, at an engagement-start control-amount detector, the control amount of the clutch in the engagement start. The clutch control method may derive, at a clutch-correctioncontrol-amount deriver, a correction control amount of the clutch based on the control amount of the clutch at the time when the engagement start is detected after the output side rotating body is temporarily stopped. The clutch control method may feedback-control, at the clutch control unit, the control amount of the clutch based on the correction control amount.

DESCRIPTION OF THE PREFERRED EMBODIMENTS

Figure 1:
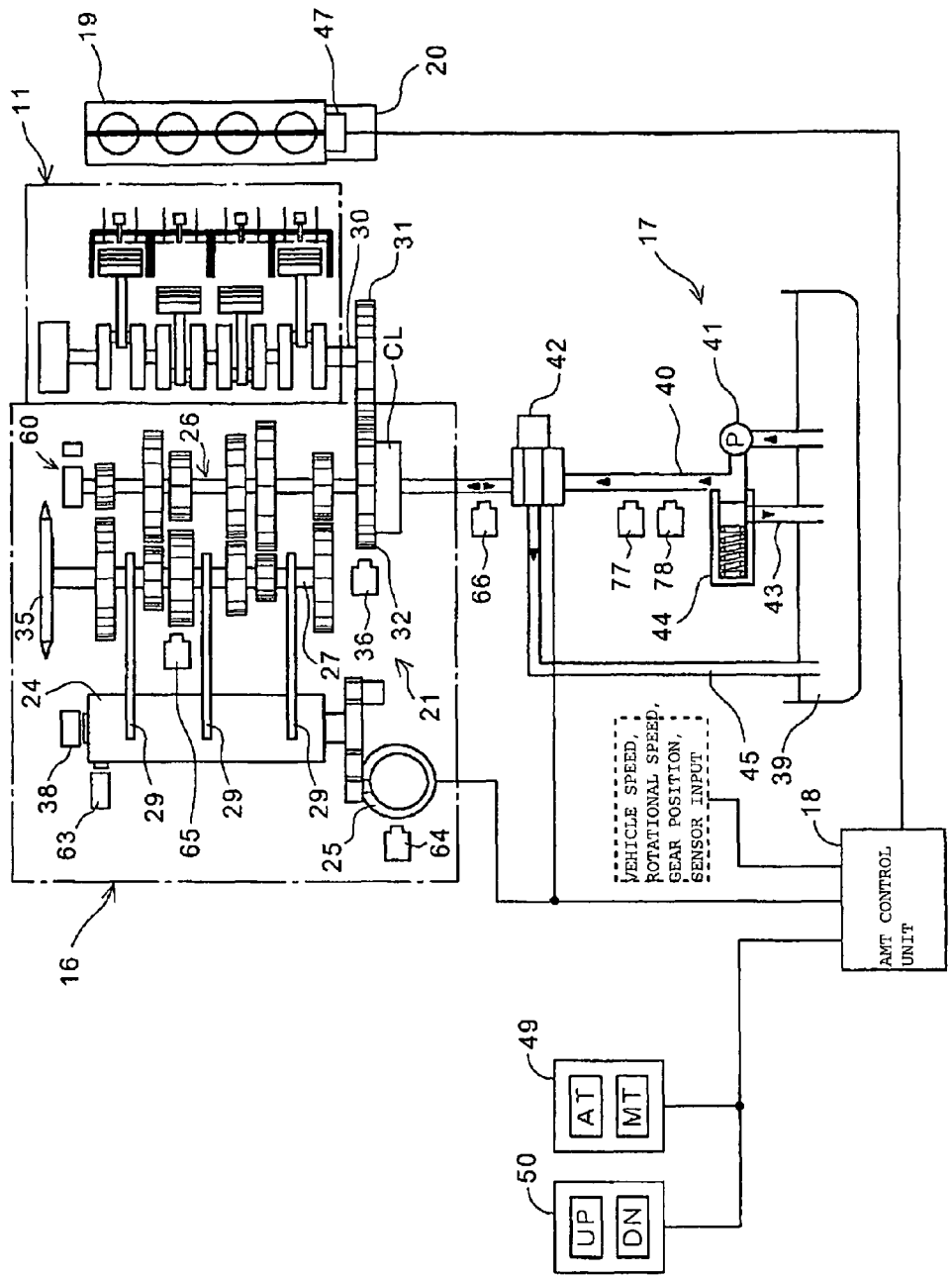
FIG. 1 is a system block diagram of an AMT as an automatic transmission and its peripheral devices.
Figure 2:
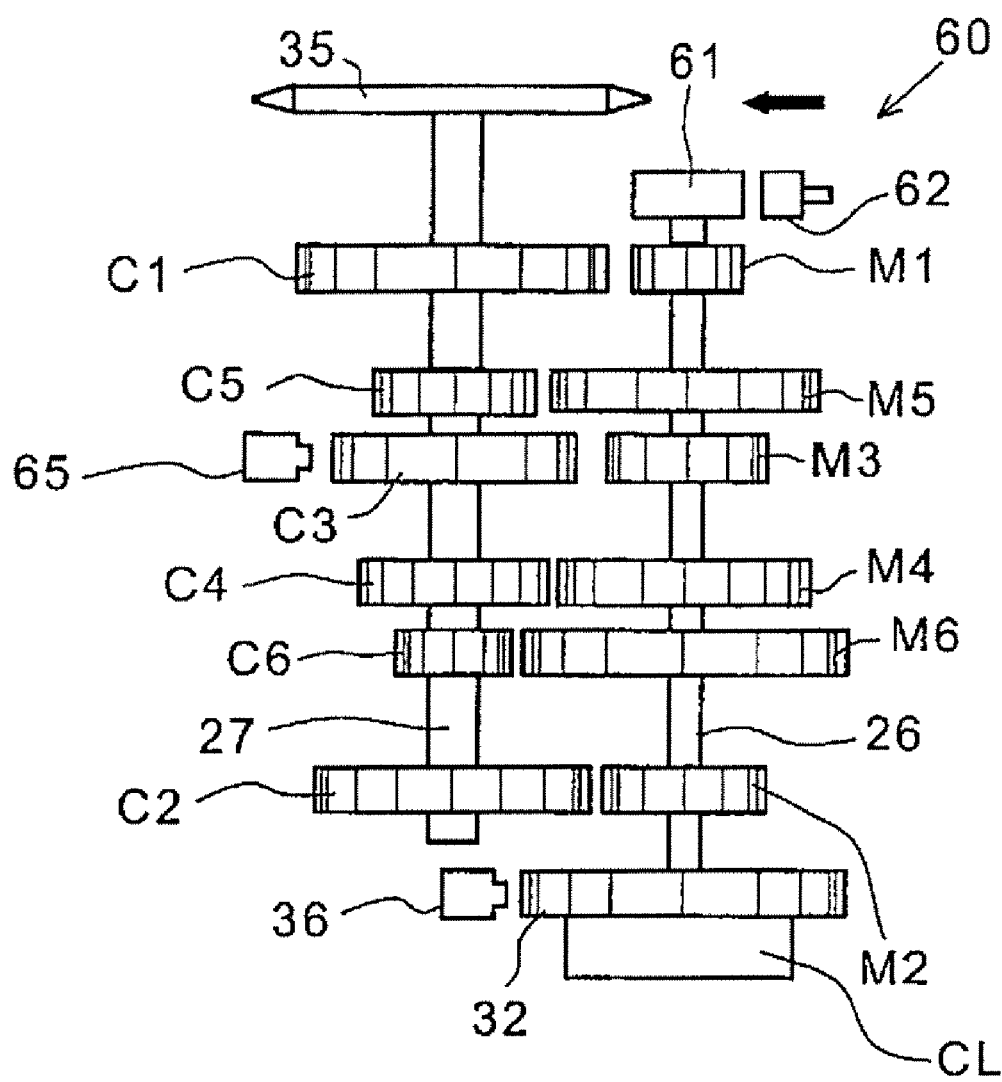
FIG. 2 is an arrangement relationship diagram showing an engagement relation of each shaft and speed gear in the AMT.

Hereafter, with reference to drawings, some of the will be described in further detail below. FIG. 1 illustrates a system block diagram of an automatic manual transmission (hereinafter, AMT) and its peripheral devices. The AMT may be adopted as an automatic transmission in a vehicle, such as a motorcycle. FIG. 2 illustrates an arrangement relationship diagram to show an engagement relation of each shaft and speed gear in an AMT 16. The AMT 16 may be a single clutch type transmission device which connects and disconnects a rotational driving force of an engine by a clutch CL disposed on a main shaft (spindle shaft). The AMT 16 may be connected to an engine 11 that may be drive-controlled by a clutch hydraulic device 17 and an AMT control unit 18 as a transmission control device. The engine 11 may include a throttle body 19 of a throttle-by-wire type. The throttle body 19 may be provided with a motor 20 for opening and closing the throttle.

The AMT 16 may include a transmission 21 of, for example, six forward speeds, the clutch CL, a shift drum 24, and a shift control motor 25 which rotates the shift drum 24. A large number of gears which constitute the transmission 21 may be bonded to or loosely fitted with a main shaft 26 and a counter shaft 27. The main shaft 26 and the counter shaft 27 may be provided with the speed gears which can be freely displaced in an axial direction of the main shaft 26 and in an axial direction of the counter shaft 27. End portions of shift forks 29 may be engaged with guide grooves formed in the shift drum 24 and the speed gears.

A primary driving gear 31 may be bonded or otherwise attached to an output shaft of the engine 11, i.e., a crankshaft 30. This primary driving gear 31 may be engaged with a primary driven gear 32. The primary driven gear 32 may be connected to the main shaft 26 via the clutch CL. Furthermore, the AMT 16 may include a main-shaft rotational-speed sensor 65 which detects a rotational speed of the main shaft 26 by measuring the rotational speed of a predetermined speed gear on the counter shaft 27.

A driving sprocket 35 may be bonded to the counter shaft 27, and a driving force may be transmitted to a rear wheel as a drive wheel via a drive chain (now shown) which is wound and hung around this driving sprocket 35. In the AMT 16, the following may be included: a primary-driven-gear rotational-speed sensor 36 which may disposed so as to face an outer circumference of the primary driven gear 32; a gear position sensor 38 which may detect a gear position of the transmission 21 on the basis of the rotation position of the shift drum 24; a shifter switch 64 which may detect a rotating position of a shifter that is driven by the shift control motor 25; and a neutral switch 63 which may detect that the shift drum 24 is at a neutral position. Furthermore, the AMT 16 may include a throttle opening sensor 47 which may detect a throttle opening is provided in the throttle body 19. In addition, an output signal from the primary-driven-gear rotational-speed sensor 36 may be detected as an engine speed.

The clutch hydraulic device 17 may include a structure in which a lubricant of the engine 11 is also used as a hydraulic fluid for driving the clutch CL. The clutch hydraulic device 17 may include an oil tank 39, and a pipe line 40 for supplying and feeding the oil (hydraulic fluid) in this oil tank 39 to the clutch CL. On the pipe line 40, the following may be included: a hydraulic pump 41 as an oil pressure supply source; and a valve (electromagnetic control valve) 42 as an actuator. A regulator 44 may be disposed on a return pipe line 43, which is connected to the pipeline 40, to maintain the pressure of oil supplied to the valve 42 at a constant value. The valve 42 may be provided with a return pipe line 45 of oil.

A pipe line which connects the valve 42 to the clutch CL may be provided with an oil pressure sensor 66 which measures an oil pressure generated in this pipe line, i.e., an oil pressure generated in the clutch CL. The pipe line 40 which connects the hydraulic pump 41 to the valve 42 may be provided with a main oil pressure sensor 77 and an oil temperature sensor 78 as oil temperature detector.

The AMT control unit 18 may be connected to a mode switch 49, which switches between an automatic transmission (AT) mode and a manual transmission (MT) mode, and a shift select switch 50, which performs shift indication of shift up (UP) or shift down (DN). The AMT control unit 18 may include a central processing unit (CPU) that may control the valve 42 and the shift control motor 25 in response to the output signals from the above-described sensors. The AMT control unit 18 may also include switches that can switch the speed stage of the AMT 16 automatically or semi-automatically.

The AMT control unit 18 may switch the speed stage automatically according to information, such as the vehicle speed, the engine speed, and the throttle opening, when the AT mode is selected. On the other hand, the AMT control unit 18 may shift up or may shift down the transmission 21 with operation of the shift select switch 50, when the MT mode is selected. Furthermore, even when the MT mode is selected, an auxiliary automatic transmission control can be performed for preventing an overspeed and a stall of the engine.

In the clutch hydraulic device 17, an oil pressure may be applied to the valve 42 by the hydraulic pump 41. This oil pressure may be controlled by the regulator 44 so that the oil pressure may not exceed an upper limit value. When the valve 42 is opened by the command from the AMT control unit 18, the oil pressure may be applied to the clutch CL, and the primary driven gear 32 may be connected to the main shaft 26 via the clutch CL. On the other hand, when the valve 42 is closed and the application of the oil pressure is stopped, the clutch CL may be energized, by a return spring (now shown) incorporated therein, in the direction so that the connection to the main shaft 26 can be cut off.

The valve 42, which drives the clutch by opening and closing the pipe line connecting the pipe line 40 to the clutch CL, may be structured so that the AMT control unit 18 can change arbitrarily the time or the like from a full close state to a full open state of the pipe line, on the basis of a drive signal.

The shift control motor 25 may rotate the shift drum 24 according to the command from the AMT control unit 18. When the shift drum 24 rotates, the shift fork 29 may be displaced in an axial direction of the shift drum 24 according to the shape of the guide grooves formed in the outer circumference of the shift drum 24. As a result, the gear engagement on the counter shaft 27 and the main shaft 26 may change and the shift up or the shift down of the transmission may be performed.

Referring to FIG. 2 additionally, the main shaft 26, which may be connected to the clutch CL, may support driving-side gears M1-M6 of the paired speed gears. The first speed driving gear M1 may be attached non-slidably in the axial direction and rotatably in the circumferential direction. The second speed driving gear M2 may be formed to the main shaft 26 integrally. Furthermore, the third speed driving gear M3 and the fourth speed driving gear M4, which may be integral therewith, may be attached slidably in the axial direction and non-rotatably in the circumferential direction. The fifth speed driving gear M5 and the sixth speed driving gear M6 may be attached non-slidably in the axial direction and rotatably in the circumferential direction.

Meanwhile, the counter shaft 27 may support driven gears C1-C6 which engage with the driving gears M1-M6. The first to fourth speed driven gears C1-C4 may be attached non-slidably in the axial direction and rotatably in the circumferential direction. The fifth and sixth speed driven gears C5 and C6 may be attached slidably in the axial direction and non-rotatably in the circumferential direction. In the AMT 16, the driving gears M3 and M4 and the driven gears C5 and C6, i.e., gears which are slidable in the axial direction, among the above-described gear train, may be slid by the shift forks 29. Accordingly, the shifting operation may be performed by connecting and disconnecting a dog clutch.

The AMT 16 according to the some embodiments may include a main shaft brake 60 as brake which can apply a certain brake force (damping force) to the main shaft 26. The main shaft brake 60 may be a friction type brake, which is operated by a driving command from the AMT control unit 18, and which may include: a disc-like brake member 61 that may be fixed to an end portion of the main shaft 26; and a braking member 62 which may contact the braked member 61. Note that the mainshaft brake unit 60 may be composed of an electromagnetic brake or the like.

Figure 3:
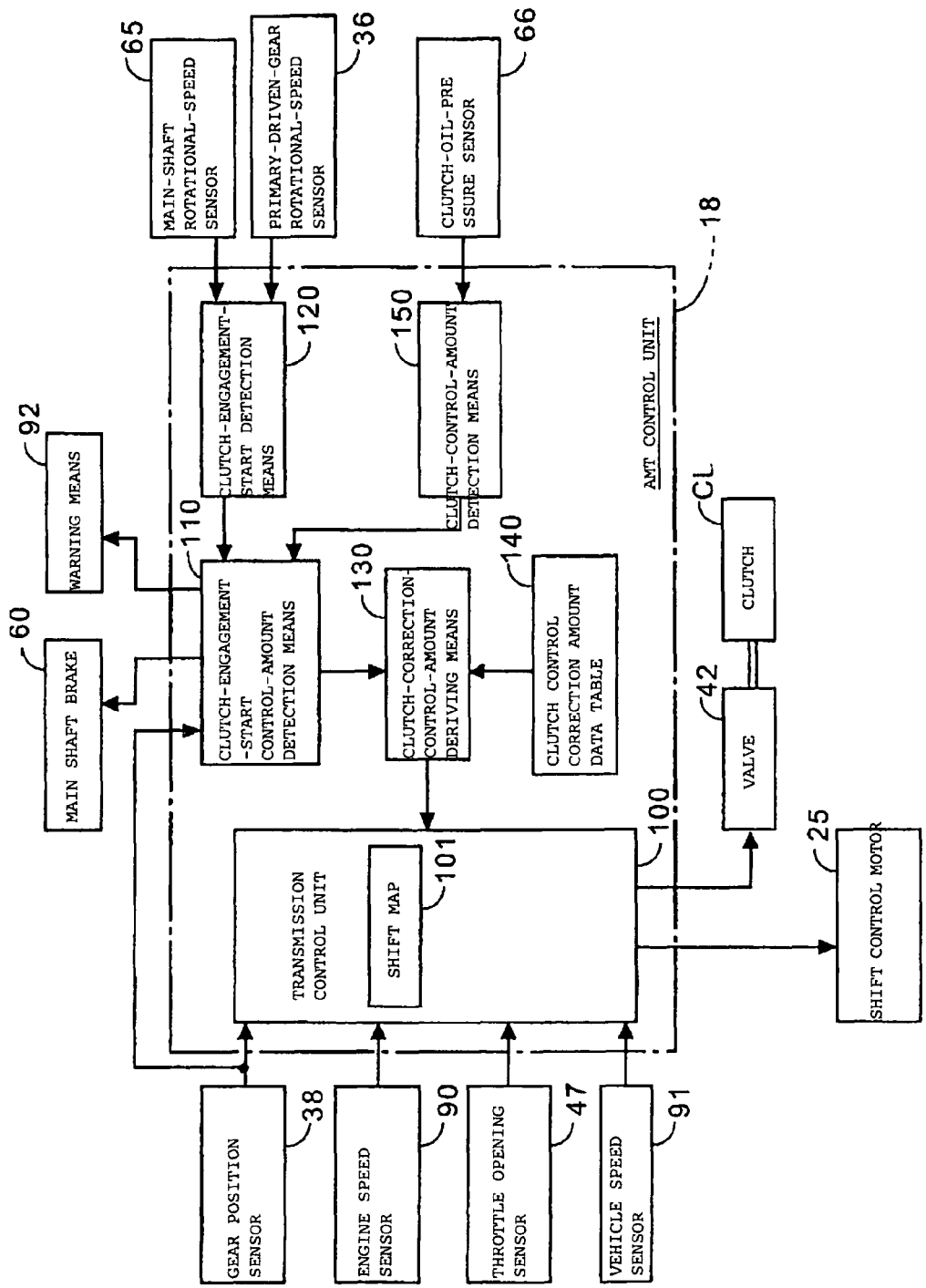
FIG. 3 is a block diagram showing a structure of an AMT control unit and its peripheral devices.

FIG. 3 illustrates a block diagram showing a structure of the AMT control unit 18 and its peripheral devices. The same numerals as the above illustrate the same or equivalent components. The AMT control unit 18 may include a transmission control unit 100 in which a shift map 101 can be stored. The transmission control unit 100 including clutch control unit that may drive the shift control motor 25 and the valve 42 and may perform the shifting operation, during normal running of a vehicle, on the basis of the gear position sensor 38, an engine speed sensor 90, the throttle opening sensor 47, a vehicle speed sensor 91, and vehicle speed information, and according to the shift map 101 which is a three-dimensional map or the like. Furthermore, the engine speed may be detected on the basis of the output signal from the primary-driven-gear rotational-speed sensor 36.

By detecting rotational speeds of an input side and an output side with respect to the clutch CL, the AMT control unit 18 according to the one embodiment can detect engagement start timing when the clutch CL is connected. In the embodiment, the primary-driven-gear rotational-speed sensor 36 may detect a rotational speed of the primary driven gear 32 serving as an input side rotating body and the main-shaft rotational-speed sensor 65 may detect a rotational speed of the main shaft 26 serving as an output side rotating body. The embodiment is structured so the primary-driven-gear rotational-speed sensor 36 can detect a rotational speed of the input side with respect to the clutch CL and the main-shaft rotational-speed sensor 65 can detect a rotational speed of the output side. As a result, timing when both synchronously rotate is detected. Specifically, when a difference between the rotational speed of the primary driven gear 32 and the rotational speed of the main shaft 26 becomes equal to or less than a predetermined value (for example, 50 rpm), a determination can be made that the clutch CL starts to be engaged.

Clutch-engagement-start detector 120 may detect that the clutch CL starts to be engaged on the basis of output information from the main-shaft rotational-speed sensor 65 and the primary-driven-gear rotational-speed sensor 36. Note that, the detection of the engagement start may be performed by detecting that the main shaft 26 and the primary driven gear 32 synchronously rotate when the clutch CL is driven in a direction so that the clutch CL can be connected from a state where the clutch CL is disconnected. Accordingly, the detection may be set to be performed when the transmission 21 is at a neutral position in the embodiment in which the AMT 16 is of the single clutch type.

Furthermore, when detecting the engagement start of the clutch CL, the clutch-engagement-start detector 120 may drive-controls the main shaft brake 60 so that the main shaft 26 can be temporarily stopped. This is because, the main shaft 26 tends to rotate together with the clutch side even in a state where the clutch CL is disconnected due to a viscosity of the lubricant or various kinds of friction. Accordingly, the embodiment is structured so the main shaft brake 60 can stop the main shaft 26 temporarily to create a state where an engagement start is suitably detected and the clutch CL may then be caused to drive in the connection direction.

The main shaft brake 60, at the time when the clutch is caused to drive in the connection direction. may be made into a state where the main shaft brake 60 can be opened completely, and also can be made into a state where the main shaft brake 60 can be continued to be applied with a predetermined damping force in order to prevent the rotation due to the viscosity of the lubricant, or the like. The magnitude of the damping force at this time can be arbitrarily set depending on the magnitude of friction, or the like. The speed at which the clutch CL is driven in the connection direction can also be set arbitrarily.

Clutch-control-amount detector 150 can detect a control amount (oil pressure) of the clutch CL on the basis of output information from the clutch-oil-pressure sensor 66. Furthermore, clutch-engagement-start control-amount detector 110 can detect a control amount of the clutch CL at the time when the engagement is started, on the basis of output signals from the clutch-engagement-start detector 120 and the clutch-control-amount detector 150.

Figure 5:
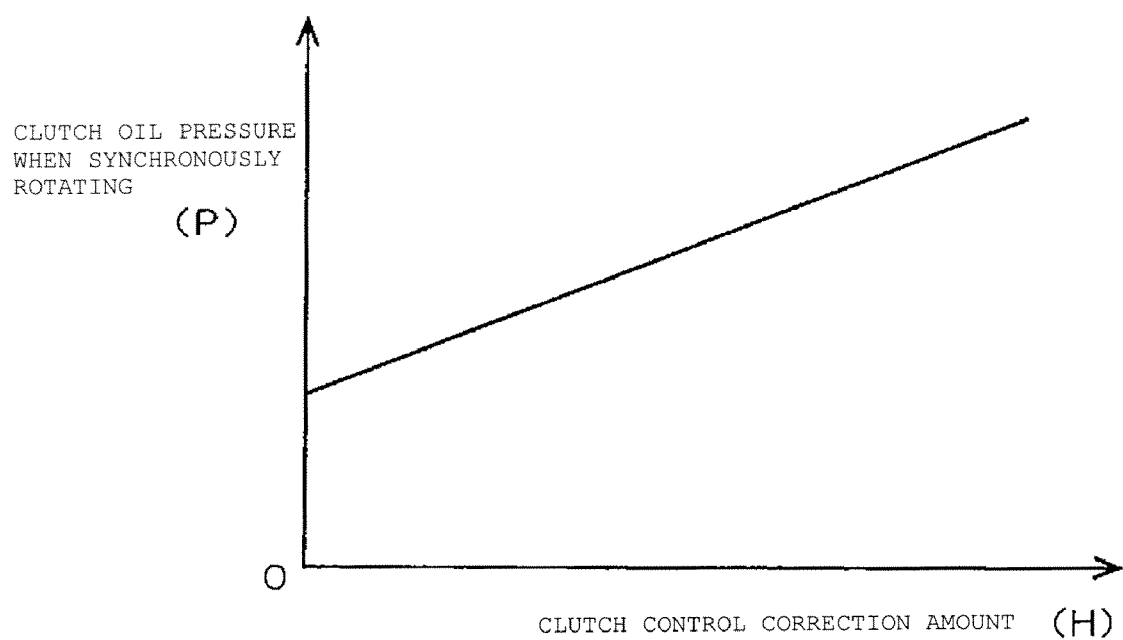
FIG. 5 is a clutch control-correction amount data table according to the present embodiment.

On the basis of the output signals from the clutch-engagement-start detector 120 and the clutch-control-amount detector 150, clutch-correction-control-amount deriver 130 may detect a control amount (oil pressure) at the time when the clutch CL starts to be engaged, and may input this control amount into a clutch control correction amount data table 140 so that a control correction amount can be derived. As illustrated in FIG. 5, the clutch control correction amount data table 140 may be configured so that a control correction amount H with respect to an oil pressure P can be determined on one-by-one basis. Furthermore, the clutch-correction-control-amount deriver 130 may transmit the derived control correction amount H to the transmission control unit 100. The transmission control unit 100 may feedback-controls the clutch CL on the basis of the transmitted control correction amount H.

Furthermore, the clutch-engagement-start control-amount detector 110 may be structured so that, when a control amount of the clutch until the main shaft 26 and the primary driven gear 32 synchronously rotate exceeds a predetermined control amount, a rider may be informed that the control amount until the clutch starts to be engaged has become large by using a warning unit 92 composed of a warning light, a speaker, and the like. Accordingly, the rider may be urged to take an action, for example, exchanging a worn-out clutch plate.

Figure 4:
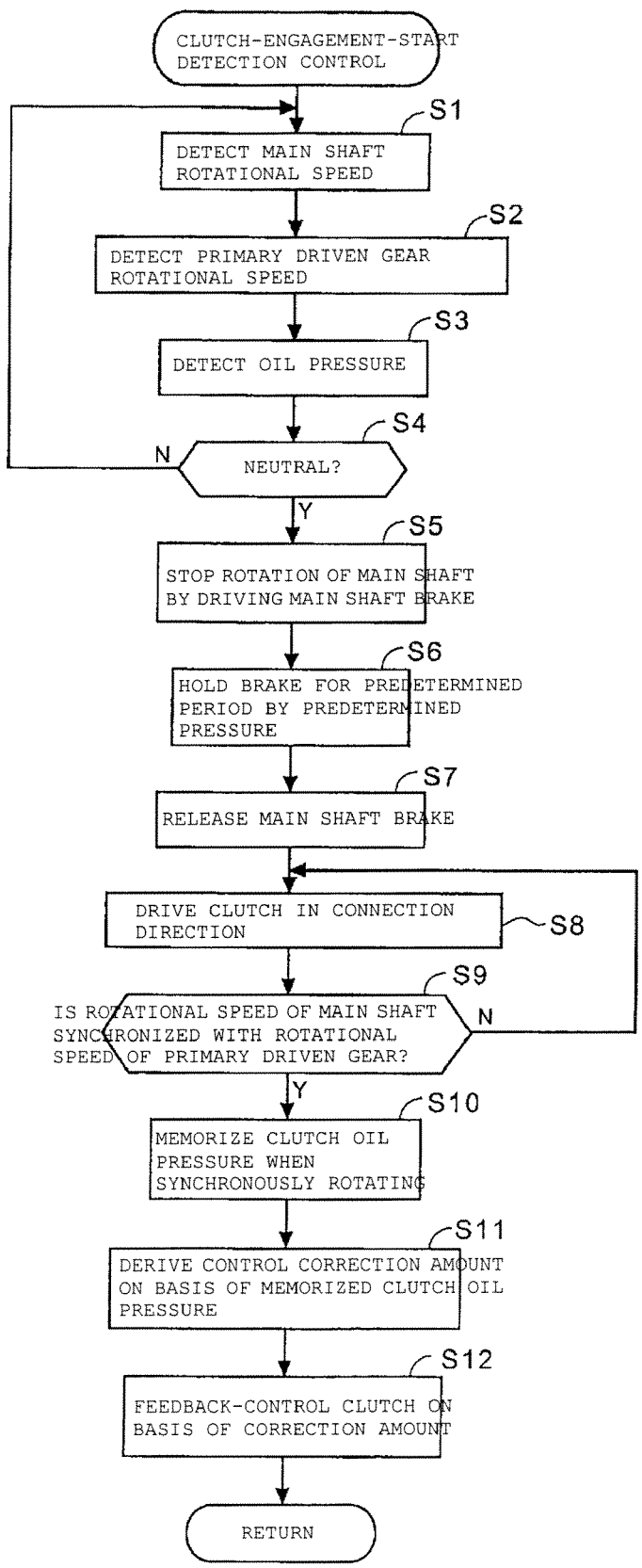
FIG. 4 is a flowchart showing a flow of a clutch-engagement-start detection control according to a first embodiment.

FIG. 4 illustrates a flowchart showing a flow of a clutch-engagement-start detection control according to one embodiment. This series of controls is performed while a vehicle may be stopped. At Step S1, an output signal of the main-shaft rotational-speed sensor 65 may be detected. At Step S2, an output signal of the primary-driven-gear rotational-speed sensor 36 may be detected. At Step S3, an output signal of the clutch-oil-pressure sensor 66 may be detected. At subsequent Step S4, it may be detected whether or not the shift drum 24 is at a neutral position. When an affirmative determination is made at Step S4, the control progresses to Step S5, and the rotation of the main shaft 26 may be made to stop temporarily by driving the main shaft brake 60. Accordingly, a preparation to detect an engagement start of a clutch can be completed. Meanwhile, when a negative determination is made at Step S4, the control returns to Step S1.

At subsequent Step S6, the main shaft brake 60 may be driven for a predetermined period by a predetermined pressure, and the brake operation may be held. Note that the predetermined period and the magnitude of the brake force to hold the brake operation can be arbitrarily set depending on the friction with which the main shaft 26 tends to rotate. Next, at Step S7, the main shaft brake 60 may be released, and the clutch CL may be driven in the connection direction at Step S8. Subsequently, at Step S9, it may be determined whether or not the rotational speed of the main shaft 26 detected by the main-shaft rotational-speed sensor 65 is synchronized with the rotational speed of the primary driven gear 32 detected by the primary-driven-gear rotational-speed sensor 36. In the embodiment, it is set that the rotational speeds may be determined to be synchronized when the rotational speed difference becomes equal to or less than a predetermined value (for example, 1 m/s). According to this setting, while accuracy variation or the like of each rotational-speed sensor is taken into consideration, a synchronized rotational speed can be detected.

Thereafter, when an affirmative determination is made at Step S9, the oil pressure value detected by the clutch-oil-pressure sensor 66 at the time of synchronous rotation may be memorized as a control amount of the clutch at Step S10. When a negative determination is made at Step S9, the control may return to Step S7.

At Step S11, the control correction amount H may be derived on the basis of the oil pressure-clutch control correction amount data table 140. Then, at Step S12, the clutch CL may be feedback-controlled on the basis of the control correction amount H, and the series of the controls may end.

Although the clutch may always be controlled by using the oil pressure-clutch control correction amount data table 140 in the above-described flowchart, such feedback control may be performed only when the control amount detected at the time of the engagement start and a predetermined reference control amount are compared, and concurrently when a difference between the amounts is greater than a predetermined value. Furthermore, the detection of the engagement start of the clutch can be periodically performed during a period from starting an engine before the vehicle starts moving or at a predetermined cycle memorized by the AMT. This predetermined cycle can be changed at any time on the basis of various kinds of information, such as an oil temperature. Furthermore, in the embodiment, although the control correction amount may be detected on the basis of the oil pressure applied to the clutch CL, the control correction amount may be detected on the basis of a drive current value of the valve 42 as an actuator which controls a supply amount of the hydraulic fluid to the clutch CL.

As described above, in the clutch control device according to the embodiment, even when the output side rotating body and the input side rotating body tend to rotate together in a state where the clutch is disconnected, by making the output side rotating body stop temporarily by the brake, it may become possible to accurately detect timing when a rotational speed difference between the two becomes equal to or less than a predetermined value. Accordingly, it may be possible to accurately detect a state of the engagement start of the clutch, and to perform a suitable feedback control.

Furthermore, the AMT 16 according to the embodiment may include the main shaft brake 60, which may be applied a damping force to the main shaft 26. Thus, while the vehicle is stopped, i.e., while the counter shaft 27 is stopped, if the main shaft brake 60 is operated to make small the rotational speed difference between the main shaft 26 and the counter shaft 27, an engaging sound of the dog clutch at the time of shifting a gear from the neutral to the first speed can be reduced.

Figure 6:
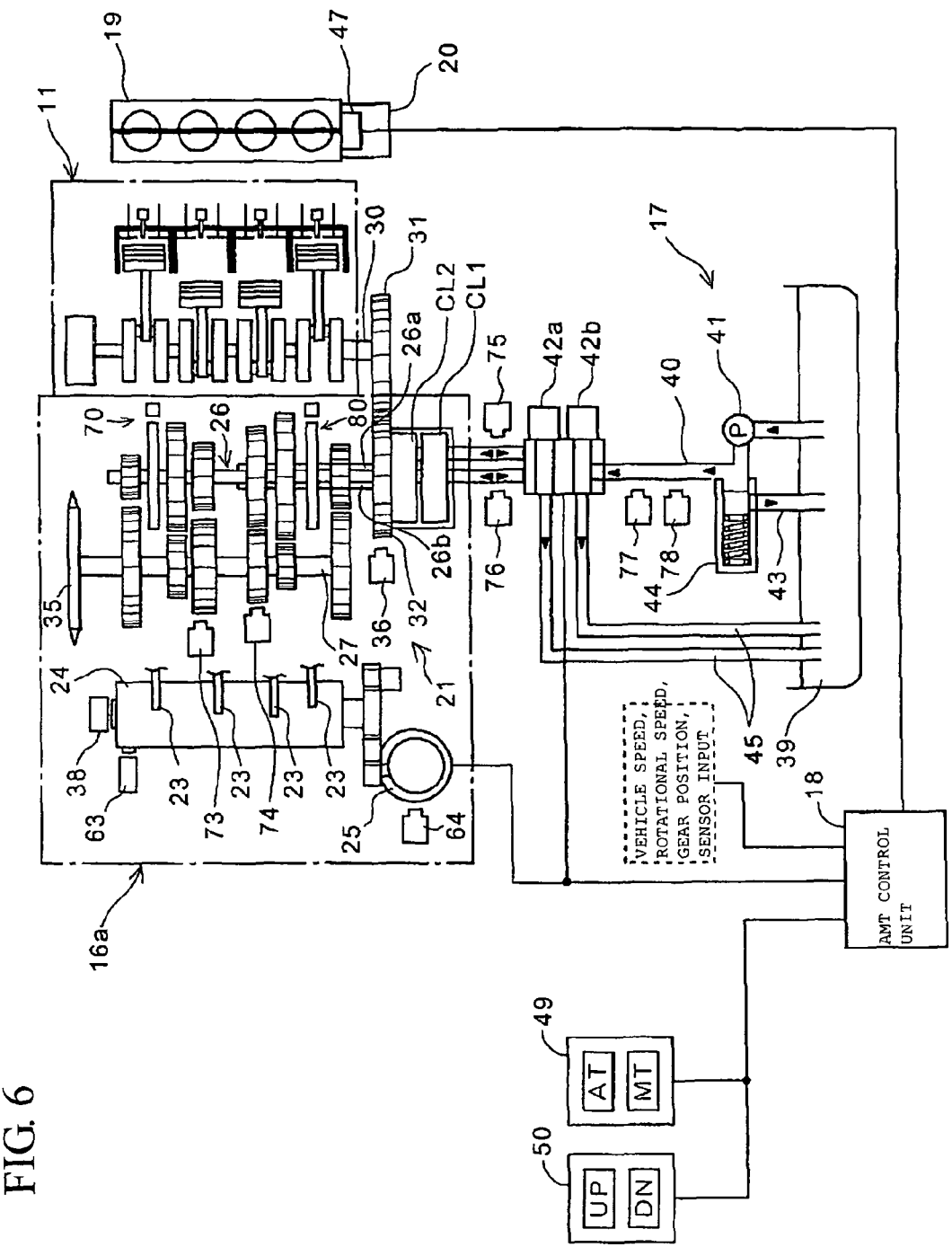
FIG. 6 is a system block diagram of an AMT and its peripheral devices according to another embodiment discussed herein.
Figure 7:
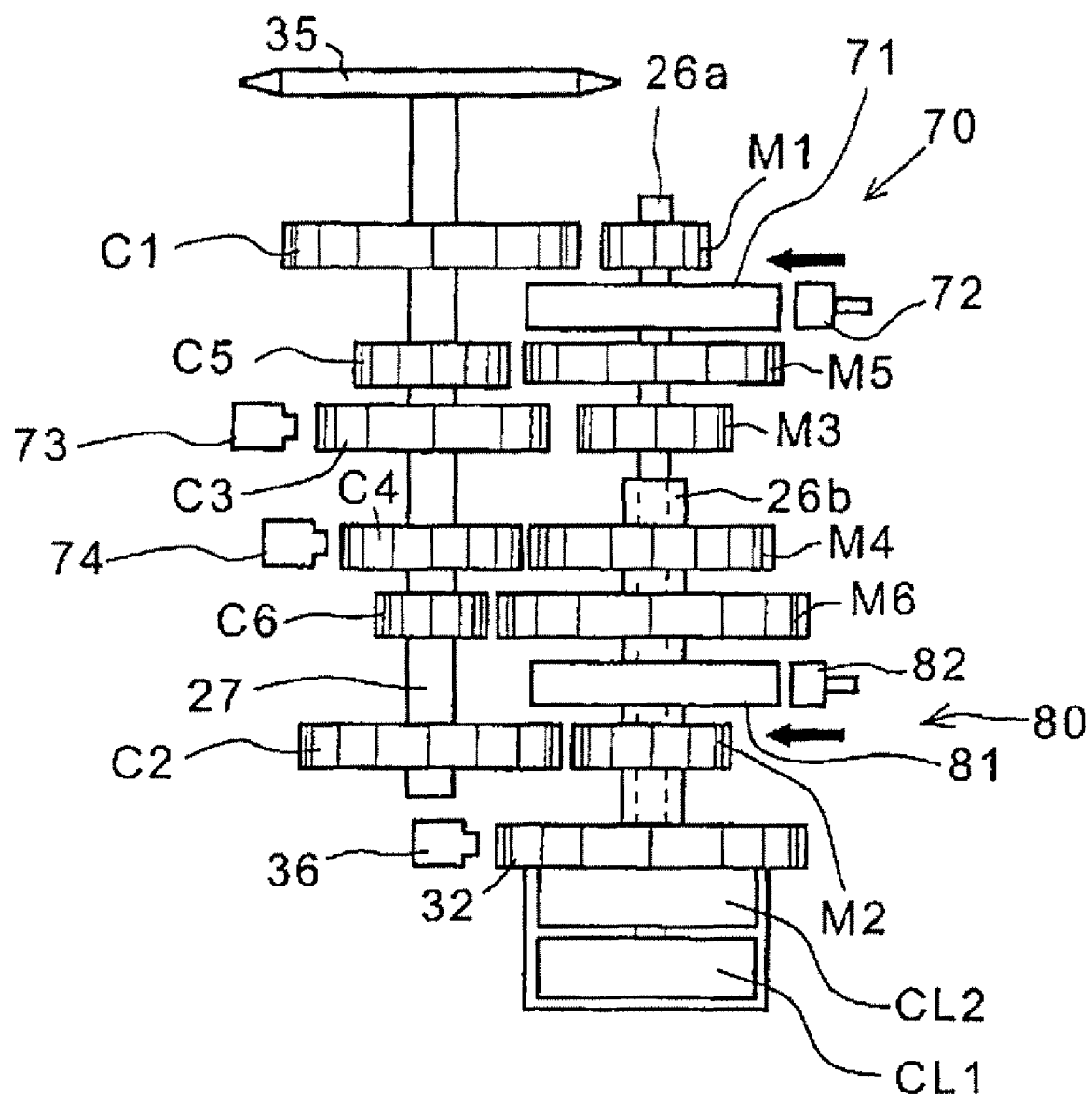
FIG. 7 is an arrangement relationship diagram showing an engagement relation of each shaft and speed gear in the AMT according to the other embodiment discussed herein.

FIG. 6 illustrates a system block diagram of an AMT 16a and its peripheral devices according to another embodiment. The same numerals as the above show the same or equivalent components. Furthermore, FIG. 7 illustrates an arrangement relationship diagram showing an engagement relation of each shaft and speed gear in the AMT 16a. The AMT 16a may be structured as a twin clutch type transmission device, which connects and disconnects a rotational driving force of the engine with two clutches disposed on the main shaft. Since the entire structure, except for the twin clutch and the twin clutch drive control unit, may be the same as that of the above-described embodiment, details thereof will be omitted.

The AMT 16 may include the transmission 21 of the six forward speeds, a first clutch CL1, a second clutch CL2, the shift drum 24, and the shift control motor 25 which rotates the shift drum 24. A large number of gears which constitute the transmission 21 may be bonded to or loosely fitted with the main shaft 26 and the counter shaft 27. The main shaft 26 may include an inner main shaft 26a and an outer main shaft 26b which may be pivotally supported and rotatable with respect to each other. The inner main shaft 26a may be bonded to the first clutch CL1, and the outer main shaft 26b may be bonded to the second clutch CL2. The main shaft 26 and the counter shaft 27 may be provided with the speed gears which can be freely displaced in an axial direction of the main shaft 26 and in an axial direction of the counter shaft 27. End portions of shift forks 23 may be engaged with guide grooves formed in the shift drum 24 and the speed gears.

The primary driving gear 31 may be bonded or otherwise attached to the output shaft of the engine 11, i.e., the crankshaft 30, and this primary driving gear 31 may also be engaged with the primary driven gear 32. The primary driven gear 32 may be connected to the inner main shaft 26a via the first clutch CL1, and may also be connected to the outer main shaft 26b via the second clutch CL2. Furthermore, the AMT 16a may include an inner-main-shaft rotational-speed sensor 73 and an outer-main-shaft rotational-speed sensor 74, which can detect rotational speeds of the inner main shaft 26a and the outer main shaft 26b, respectively, by measuring the rotational speed of a predetermined speed gear on the counter shaft 27.

Valves as an actuator may be composed of a first valve 42a and a second valve 42b, which can apply oil pressures to the first clutch CL1 and the second clutch CL2 individually. Each of the valves may be provided with the return pipe line 45 of oil.

A pipe line which connects the first valve 42a to the first clutch CL1 may be provided with a first-clutch-oil-pressure sensor 75, which measures an oil pressure generated in the first clutch CL1. Similarly, a pipe line, which connects the second valve 42b to the second clutch CL2, may be provided with a second-clutch-oil-pressure sensor 76, which measures an oil pressure generated in the second clutch CL2.

In the clutch hydraulic device 17, an oil pressure may be applied to the valve 42 by the hydraulic pump 41. This oil pressure may be controlled by the regulator 44 so that the oil pressure may not exceed an upper limit value. When the valve 42a or the valve 42b is opened by the command from the AMT control unit 18, the oil pressure may be applied to the first clutch CL1 or the second clutch CL2, and the primary driven gear 32 may be connected to the inner main shaft 26a or the outer main shaft 26b via the first clutch CL1 or the second clutch CL2. On the other hand, when the valve is closed and the application of the oil pressure is stopped, the first clutch CL1 and the second clutch CL2 may be energized, by return springs incorporated therein, in the direction so that the connections to the inner main shaft 26a and the outer main shaft 26b can be cut off.

The shift control motor 25 may rotate the shift drum 24 according to the command from the AMT control unit 18. When the shift drum 24 rotates, the shift fork 23 may be displaced in the axial direction of the shift drum 24 according to the shape of the guide grooves formed in the outer circumference of the shift drum 24. As a result, the gear engagement on the counter shaft 27 and the main shaft 26 may change, and the shift up or the shift down of the transmission may be performed.

The AMT 16a according to the embodiment may be structured so that the inner main shaft 26a bonded to the first clutch CL1 may support odd-numbered speed gears (first, third, and fifth speed) and the outer main shaft 26b bonded to the second clutch CL2 may support even-numbered speed gears (second, fourth, and sixth speed). Therefore, for example, during running in the odd-numbered speed gear, an oil pressure supply to the first clutch CL1 may be continued, and a connected state may be maintained. Furthermore, while a shift change is performed, it may become possible, by changing the gear engagement in advance by the rotation of the shift drum 24, to complete the shifting operation only by switching the connected states of the two clutches.

Referring to FIG. 7 additionally, the inner main shaft 26a, which may be connected to the first clutch CL1, may support the driving gears M1, M3, and M5 of the odd-numbered speed stage. The first speed driving gear M1 may be formed to the inner main shaft 26a integrally. Furthermore, the third speed driving gear M3 may be attached slidably in the axial direction and non-rotatably in the circumferential direction. The fifth speed driving gear M5 may be attached non-slidably in the axial direction and rotatably in the circumferential direction. On the other hand, the outer main shaft 26b, which may be connected to the second clutch CL2, may support the driving gears M2, M4, and M6 of the even-numbered speed stage. The second speed driving gear M2 may be formed to the outer main shaft 26b integrally. Furthermore, the fourth speed driving gear M4 may be attached slidably in the axial direction and non-rotatably in the circumferential direction. The sixth speed driving gear M6 may be attached non-slidably in the axial direction and rotatably in the circumferential direction.

Meanwhile, the counter shaft 27 may support the driven gears C1-C6, which engage with the driving gears M1-M6. The first to the fourth speed driven gears C1-C4 may be attached non-slidably in the axial direction and rotatably in the circumferential direction. The fifth and sixth speed driven gears C5 and C6 may be attached slidably in the axial direction and non-rotatably in the circumferential direction. In the AMT 16a, the driving gears M3 and M4 and the driven gears C5 and C6, i.e., gears, which can be slidable in the axial direction, among the above-described gear train, may be slid by the shift forks 23. Accordingly, the shifting operation may be performed by connecting and disconnecting a dog clutch.

Furthermore, the AMT 16a according to the embodiment may include an inner main shaft brake 70 and an outer main shaft brake 80 in the inner main shaft 26a and the outer main shaft 26b, respectively. The inner main shaft brake 70, which may apply a damping force to the inner main shaft 26a, may include a disk-like braked member 71 that can be fixed to the inner main shaft 26a and a braking member 72, which can contact the braked member 71. Furthermore, the outer main shaft brake 80, which may apply a damping force to the outer main shaft 26b, may include a disk-like braked member 81 that can be fixed to the outer main shaft 26b and a braking member 82, which can contact the braked member 81.

In the AMT 16a according to the embodiment, for example, when the first speed gear is selected, the rotational driving force of the engine, which is transmitted to the primary driven gear 32 from the crankshaft 30, may be transmitted to the inner main shaft 26a by connecting the first clutch CL1 thereto. The rotational driving force may be transmitted to the counter shaft 27 via the first speed driven gear C1 from the first speed driving gear M1. At this time, a dog clutch for the first speed can be in a state of being engaged between the first speed driven gear C1 and the fifth speed driven gear C5.

Furthermore, when the rotational driving force is transmitted by the first speed gear, the AMT 16a can execute "preliminary shifting" which prepares a speed change for the second speed by engaging a dog clutch for the second speed, i.e., the dog clutch between the sixth speed driven gear C6 and the second speed driven gear C2. At this time, since the second clutch CL2 is disconnected, even if the dog clutch for the second speed is engaged during running in the first speed gear, the rotational driving force of the engine may only make the outer main shaft 26b run idle with the second speed driving gear M2. Furthermore, after this preliminary shifting, if the connected state of the clutch is switched from the first clutch CL1 to the second clutch CL2, the rotational driving force can be outputted instantly without interruption from the counter shaft via the second speed gear.

The shift drum 24 of the AMT 16a may be set to have a position of "waiting for neutral" between each of predetermined rotating positions for selecting each speed stage. At the position of "waiting for neutral", a group of gears not transmitting the rotational driving force, among groups of the even-numbered speed gears and the odd-numbered speed gears, may be made to be in a neutral state. For this reason, it may be possible to make the odd-numbered speed gear into the neutral state during running in the even-numbered speed gear, as well as to make the even-numbered speed gear into the neutral state during running in the odd-numbered speed gear. Therefore, in the structure of the AMT 16a according to the embodiment, not only while a vehicle is stopped but also while a vehicle is running in a predetermined gear selected, an engagement start of the clutch with respect to each of the clutches CL1 and CL2 can be detected.

Figure 8:
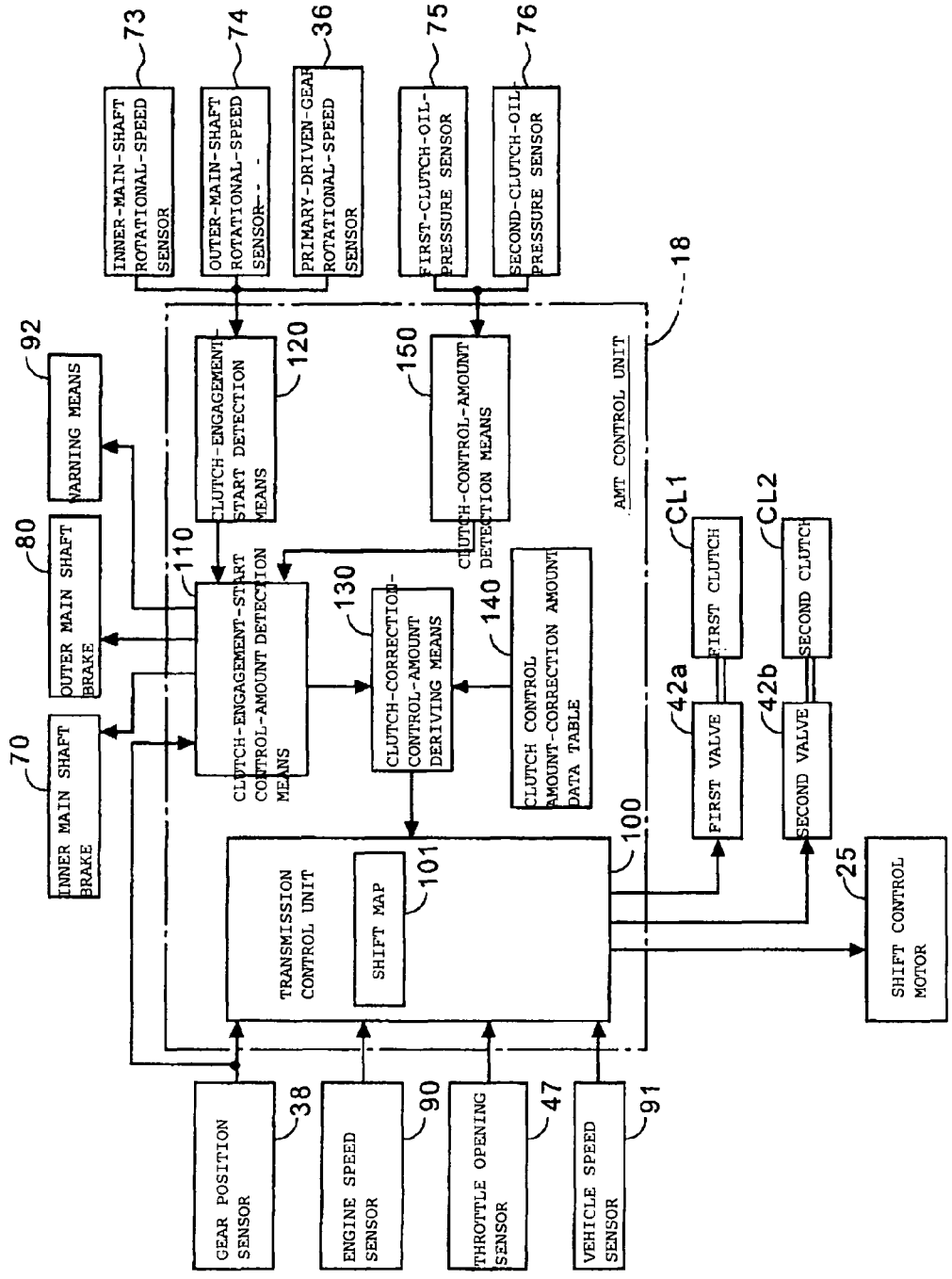
FIG. 8 is a block diagram showing a structure of an AMT control unit and its peripheral devices according to the other embodiment discussed herein.

FIG. 8 illustrates a block diagram showing a structure of the AMT control unit 18 and its peripheral devices according to other embodiment. The same numerals as the above show the same or equivalent components. This embodiment is the same as the embodiment described above except for the valves, which drive the first clutch CL1 and the second clutch CL2, that may be composed of the first valve 42a and the second valve 42b. This embodiment may include the inner-main-shaft rotational-speed sensor 73 and the outer-main-shaft rotational-speed sensor 74 as well as the inner main shaft brake 70, which brakes the inner main shaft 26a, and the outer main shaft brake 80, which brakes the outer main shaft 26b. Accordingly, detailed explanations thereof will be omitted.

By detecting the rotational speeds of an input side and an output side with respect to each of the clutches CL1 and CL2, the AMT control unit 18 can detect each engagement start timing when both of the clutches CL1 and CL2 are connected. In the embodiment, the inner-main-shaft rotational-speed sensor 73 may detect a rotational speed of the output side with respect to the first clutch CL1. Meanwhile, the outer-main-shaft rotational-speed sensor 74 may detect a rotational speed of the output side with respect to the second clutch CL2. Furthermore, the primary-driven-gear rotational-speed sensor 36 may detect each rotational speed of the input side of each clutch.

As described above, detection of the engagement start of the clutch may be performed by detecting timing when the inner main shaft 26a or the outer main shaft 26b and the primary driven gear 32 synchronously rotate, when the first clutch CL1 or the second clutch CL2 is driven in the connection direction gradually after the first clutch CL1 or the second clutch CL2 is disconnected. In the AMT 16a of the twin clutch type, when the shift drum is at a predetermined "waiting for neutral" position during running in a predetermined speed stage, the detection of the engagement start can be performed on a side among the first clutch CL1 or the second clutch CL2 being disconnected. In other words, the detection of the engagement start can be performed on the first clutch CL1 during running in the even-numbered speed gear, and the detection of the engagement start can be performed on the second clutch CL2 during running in the odd-numbered speed gear. In addition, when the vehicle is stopped with the transmission 21 being in a neutral state, the detection can be performed alternatively on the first clutch CL1 and the second clutch CL2.

The clutch-engagement-start detector 120 may drive-control the inner main shaft brake 70 when detecting the engagement start of the first clutch CL1, and drive-control the outer main shaft brake 80 when detecting the engagement start of the second clutch CL2. Furthermore, when the engagement start of the clutch is detected, the inner main shaft brake 70 or the outer main shaft brake 80 can be made into a completely open state, and also can be made into a state where the inner main shaft brake 70 or the outer main shaft brake 80 can be continued to be applied with a predetermined damping force in order to prevent rotation due to the viscosity of the lubricant of the clutch, friction generated between the inner main shaft 26a and the outer main shaft 26b, or the like. This magnitude of the damping force can be arbitrarily set depending on the magnitude of friction, or the like.

The clutch-control-amount detector 150 may detect a control amount of each of the first clutch CL1 and the second clutch CL2 on the basis of output information from the first-clutch-oil-pressure sensor 75 and the second-clutch-oil-pressure sensor 76. Furthermore, the clutch-engagement-start control-amount detector 110 may detect each of the control amount at the time when the clutch starts to be engaged on the basis of output signals from the clutch-engagement-start detector 120 and the clutch-control-amount detector 150.

On the basis of the output signals from the clutch-engagement-start detector 120 and the clutch-control-amount detector 150, the clutch-correction-control-amount deriver 130 may detect a control amount (oil pressure) at the time when each of the clutches starts to be engaged. As a result, the control amount may be inputted into the clutch control correction amount data table 140 so that a control correction amount is derived.

Figure 9:
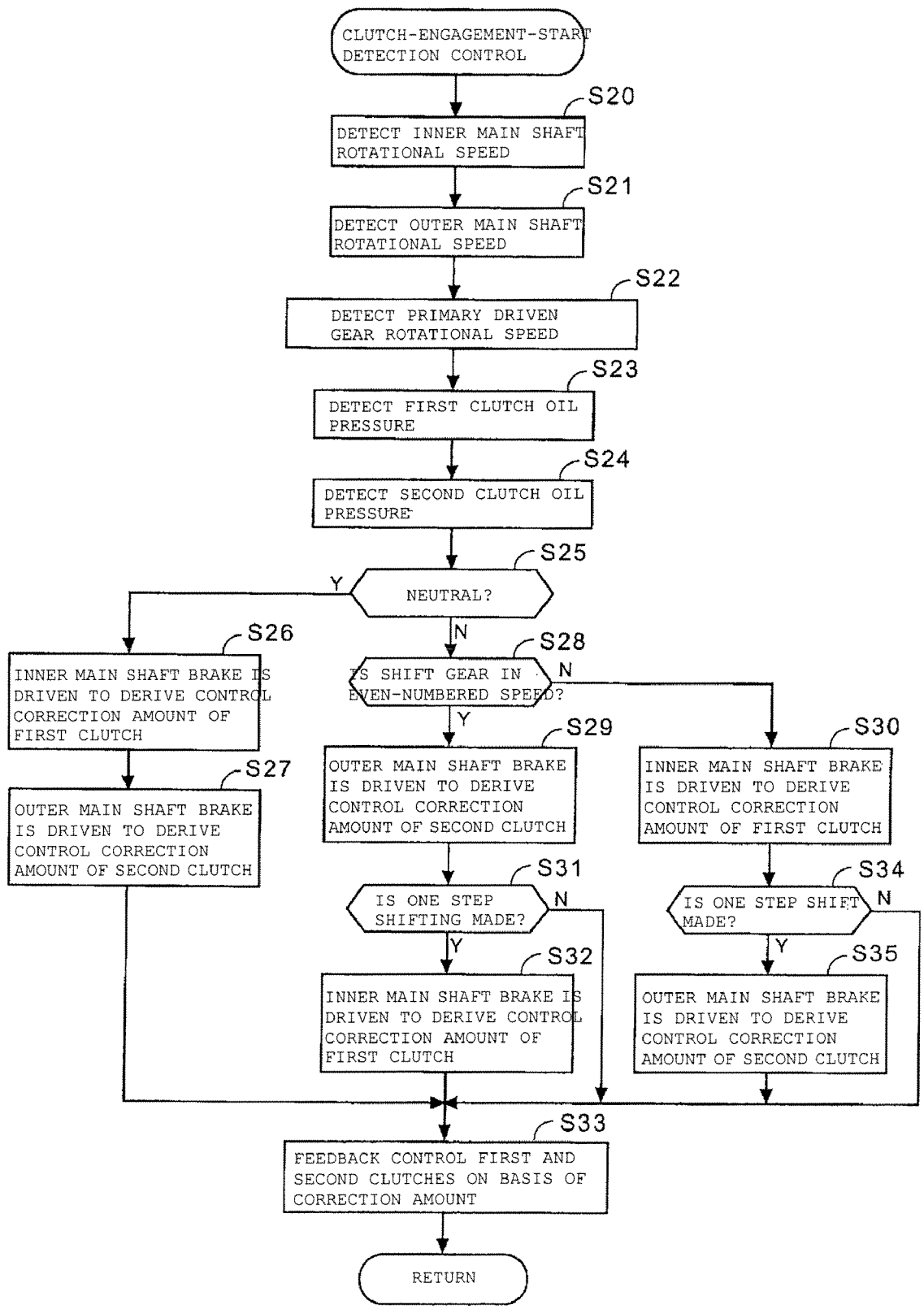
FIG. 9 is a flowchart showing a flow of a clutch-engagement-start detection control according to the other embodiment discussed herein.

FIG. 9 illustrates a flowchart showing a flow of a clutch-engagement-start detection control according to the other embodiment. Note that, at the time of detecting the engagement start of a clutch, the flow until the clutch is driven in the connection direction after the main shaft is stopped temporarily to detect synchronous timing of the rotational speed, and a control correction amount is derived on the basis of the control amount at the time when the engagement start is detected, is the same as that in the case of the single clutch type explained in FIG. 4. Accordingly, in the AMT 16a of the twin clutch type, a description will be given mainly of the order used to perform detection of an engagement start with respect to the first clutch CL1 and the second clutch CL2.

First, at Steps S20-24, output signals of the inner-main-shaft rotational-speed sensor 73, the outer-main-shaft rotational-speed sensor 74, the primary-driven-gear rotational-speed sensor 36, the first-clutch-oil-pressure sensor 75, and the second-clutch-oil-pressure sensor 76 are detected, respectively.

At subsequent Step S25, it may be detected whether or not the shift drum 24 is at a neutral position. Note that, the neutral positions here refers to a rotating position where both of an even-numbered speed gear and an odd-numbered speed gear are in a neutral state, and where the above-described neutral switch 63 is set to ON. When the AMT 16a is in an automatic transmission (AT) mode, this neutral position may be set to be selected only when the vehicle is stopped. Stated another way, when an affirmative determination is made at Step 25, the control progresses to Step S26 assuming that the vehicle may be stopping.

At Step S26, the inner main shaft brake 70 may be driven to derive a control correction amount of the first clutch CL1. At subsequent Step S27, the outer main shaft brake 80 may be driven to derive a control correction amount of the second clutch CL2. Then, the control progresses to Step S33, and both of the clutches are feedback-controlled. Thus, this series of controls ends. Note that, when an affirmative determination is made at Step S25, detection of the engagement start may be started from the second clutch CL2.

On the other hand, when a negative determination is made at Step S25, the control progresses to Step S28 assuming that the vehicle is running. Then, a determination can be made as to whether or not a speed gear is in the even-numbered speed. When an affirmative determination is made at Step S28, the control progresses to Step S29, and the outer main shaft brake 80 can be driven to detect an engagement start, and a control correction amount of the second the clutch CL2 can be derived.

At subsequent Step S31, it may be determined whether or not one step shifting is made. When an affirmative determination is made, the control progresses to Step S32 assuming that the gear has been shifted to the even-numbered speed gear. At Step S32, the inner main shaft brake 70 may be driven to derive a control correction amount of the first clutch CL1. Accordingly, the control correction amounts of both the clutches CL1 and CL2 may be derived. The control progresses to Step S33, and a feedback control may be performed. Thus, the series of controls can end. Note that, when a negative determination is made at Step S31, the control progresses to Step S33, and the feedback control may be performed. A control correction amount of the first clutch CL1 may be derived when a next detection preparation is completed. Furthermore, the clutch control resulting from the control correction amount may be promptly performed, when any one of the control correction amounts is derived.

Meanwhile, when a negative determination is made at Step S28, i.e., when the speed stage is determined to be in the odd-numbered speed, the control progresses to Step S30. The inner main shaft brake 70 may be driven to derive a control correction amount of the first clutch CL1. Furthermore, at Step S34, it may be determined whether or not one step shifting is made. When an affirmative determination is made, the control progresses to Step S35 assuming that the gear has been shifted to the odd-numbered speed gear. At Step S35, the outer main shaft brake 80 may be driven to derive a control correction amount of the second clutch CL2. Accordingly, the control correction amounts of both the clutches CL1 and CL2 may be derived. The control progresses to Step S33, and a feedback control may be performed. Thus, the series of controls may end. Note that, when a negative determination is made at Step S34, the control progresses to Step S33. A control correction amount of the second clutch CL2 may be derived when a next detection preparation for an engagement start is completed. It should be noted that, in the embodiment also, a predetermined time and a magnitude of the brake for driving the inner main shaft brake 70 and the outer main shaft brake 80 can be set arbitrarily depending on friction or the like.

As described above, in the clutch control device according to the other embodiment, by performing detection of an engagement start of a clutch with respect to the first clutch CL1 and the second clutch CL2 alternatively, a state of the engagement start of both the clutches may be detected even while a vehicle is running. Even when the state of the engagement start of the clutch is changed while the vehicle is running, may be become possible to update a correction amount of a clutch control as required to feedback on the control of the clutch.

As described above, in the clutch control device according to the embodiment, even when the output side rotating body and the input side rotating body tend to rotate together in a state where the clutch is disconnected, by making the output side rotating body stop temporarily by the brake, it may be become possible to accurately detect timing when a rotational speed difference between the output side rotating body and the input side rotating body becomes equal to or less than a predetermined value. Accordingly, an engagement of the clutch can be detected accurately, and a suitable feedback control can be performed.

Note that, structures of the twin clutch type transmission device, brake, and rotational speed detector for the input side rotating body and the output side rotating body of the clutch, the structure of the clutch control amount-correction amount data table, setting of a predetermined value which determines that the input side rotating body and the output side rotating body have synchronously rotated, setting of a damping force after the output side rotating body is stopped temporarily, or the like, are not limited to the above-described embodiments. Various modifications are possible. A clutch control device according to one of the embodiments may be adopted, without limitation to a motorcycle, in a tricycle, a four-wheeled vehicle, and the like.

According to one embodiment, a clutch control device is provided for a clutch to connect and to disconnect a rotational driving force transmitted to a drive wheel from a power source of a vehicle. The clutch includes an input side rotating body and an output side rotating body which may synchronously rotate with the clutch being connected. The clutch control device includes an input side rotational speed detector for detecting a rotational speed of the input side rotating body. The clutch control device includes an output side rotational speed detector for detecting a rotational speed of the output side rotating body. The clutch control device includes a clutch control unit for controlling an control amount of the clutch. The clutch control device includes a brake for temporarily stopping the output side rotating body while the clutch is disconnected. The clutch control device includes a clutch-control-amount detector for detecting the control amount of the clutch. The clutch control device includes an engagement start detector for detecting an engagement start of the clutch when a rotational speed difference between the input side rotating body and the output side rotating body becomes equal to or less than a predetermined value. The clutch control device includes an engagement-start control-amount detector for detecting the control amount of the clutch in the engagement start. The clutch control device also includes a clutch-correction-control-amount deriver for deriving an correction control amount of the clutch on the basis of the control amount of the clutch when the engagement start is detected after the output side rotating body is stopped temporarily. The clutch control unit feedback-controls the control amount of the clutch on the basis of the correction control amount.

According to another embodiment, the brake continues a brake operation for a predetermined period even after the output side rotating body is stopped temporarily.

According to another embodiment, the clutch may be of a hydraulic type. The engagement-start control-amount detector may derive control amount of the clutch on the basis of an oil pressure generated in the clutch.

According to another embodiment, the clutch may be of an hydraulic type driven by an oil pressure supplied from an oil pressure supply source. The clutch control device may also include an actuator which is provided between the oil pressure supply source and the clutch and which controls a flow rate of a hydraulic fluid supplied to the clutch. The engagement-start control-amount detector may derive the control amount of the clutch on the basis of a drive current value of the actuator.

According to another embodiment; the clutch control device further includes a staged transmission which transmits the rotational driving force to the drive wheel with a predetermined gear ratio. The clutch may be a twin clutch, which includes a first clutch and a second clutch, and may be structured so that a connecting-and-disconnecting state of the twin clutch may be switched alternatively for every shifting operation of the staged transmission. The staged transmission may be structured so that, among an odd-numbered speed gear and an even-numbered speed gear, a gear on a side where the rotational driving force is not transmitted can be made into a neutral state by disconnecting any one of the first clutch and the second clutch. The engagement start detector may detect the engagement start with respect to the disconnected side of any of the first clutch and the second clutch.

According to another embodiment, the engagement start detector may detect the engagement start at every predetermined cycle.

According to another embodiment, the clutch-correction-control-amount deriver may derive the correction control amount on the basis of a data table which specifies in advance a relation between the control amount of the clutch and the correction control amount at the time when the engagement start is detected.

According to another embodiment, the clutch control unit includes a a warning unit to warn that the control amount of the clutch at the time when the engagement start is detected exceeds a predetermined value.

According to another embodiment, while the clutch is disconnected, the brake may temporarily stop the output side rotating body of the clutch. As a result, an engagement start of the clutch can be detected as the rotational speed difference between the input side rotating body and the output side rotating body becomes equal to or less than a predetermined value. In addition, a correction control amount of the clutch may be derived on the basis of the control amount of the clutch when the engagement start is detected. Then, on the basis of this correction control amount, the clutch can be feedback-controlled. Therefore, by detecting timing when the clutch actually starts to be engaged, even when a frictional force generated in the clutch changes due to a change in friction characteristics of a clutch plate or characteristics of a lubricant, the clutch can be feedback-controlled by using a suitable control correction amount. Furthermore, even when the output side rotating body and the input side rotating body are easy to rotate together with the clutch being disconnected, by stopping the output side rotating body stop temporarily, it may become possible to securely detect timing when the rotational speed difference between the input side rotating body and the output side rotating body becomes equal to or less than a predetermined value.

According to another embodiment, in a staged transmission of a dog clutch type in which multiple gear pairs are disposed between a main shaft and a counter shaft, when the clutch is disposed on the main shaft and the output side rotating body is bonded to this main shaft, by stopping a rotation of the main shaft by the brake, a shifting shock which occurs in shifting from a neutral to a first speed can be reduced while a rotation of the counter shaft is stopping. Furthermore, an engaging sound can also be reduced when a relative rotating speed of the dog clutch becomes small.

According to another embodiment, the brake continues a brake operation for a predetermined period even after the output side rotating body is stopped temporarily. Thus, when the output side rotating body tends to rotate, even after the main shaft is stopped temporarily, by the viscosity of a lubricant of the clutch, friction, or the like, the rotation can be prevented and an engagement start of the clutch can be detected.

According to another embodiment, the clutch can be of the hydraulic type and the engagement-start control-amount detector may derive the control amount of the clutch on the basis of an oil pressure generated in the clutch. As a result, it may become possible to derive a control amount of the clutch using oil pressure detector which measures the oil pressure generated in the clutch.

According to another embodiment, the clutch can be of the hydraulic type driven by an oil pressure supplied from the oil pressure supply source. The clutch control device may include the actuator, which is provided between the oil pressure supply source and the clutch, and which controls a flow rate of the hydraulic fluid supplied to the clutch. The engagement-start control-amount detector may derive the control amount of the clutch on the basis of a drive current value of the actuator. As a result, it may become possible to derive a control amount of the clutch on the basis of the drive current value of the actuator.

According to another embodiment, the clutch control device may include the staged transmission which transmits the rotational driving force to the drive wheel with a predetermined gear ratio. The clutch may be the twin clutch, which may include the first clutch and the second clutch. The engagement start detector may detect the engagement start with respect to a disconnected side among the first clutch and the second clutch. Thus, it may become possible to detect an engagement start of both clutches even when the vehicle is running. Accordingly, it may become possible to update the control correction amount of the clutch as required even when the engagement start of the clutch changes during the running.

According to another embodiment, the engagement start detector detects the engagement start at every predetermined cycle. Thus, a feedback control amount may be updated at every predetermined cycle, and more suitable clutch control may become possible.

According to another embodiment, the clutch-correction-control-amount deriver may derive the correction control amount on the basis of the data table which specifies in advance a relation between the control amount of the clutch and the correction control amount at the time when the engagement start is detected. Thus, a correction control amount of the clutch can be derived easily.

According to another embodiment, the clutch control unit may warn with a warning unit that the control amount of the clutch at the time when the engagement start is detected exceeds a predetermined value. Thus, it may become possible to make a user recognize that the control amount until the clutch starts to be engaged has become large. Accordingly, this makes it possible to cause the user to take an action, for example, exchanging a worn-out clutch plate.

The above-described structural components may be described using corresponding means-plus-function terminology. For example, an output side rotational speed detection means may correspond to an output side rotational speed detector, an input side rotational speed detection means may correspond to an input side rotational speed detector, a clutch control means may correspond to a clutch control unit, a brake means may correspond to a brake means, and a clutch-control-amount detection means may correspond to a clutch-control-amount detector. Furthermore, an engagement start detection means may correspond to an engagement start detector, an engagement-start control-amount detection means may correspond to an engagement-start control amount detector, a clutch-correction-control amount deriving means may correspond to a clutch-correction-control amount deriver, and a staged transmission means may correspond to a staged transmission unit.

The above-described embodiments are not the only form of the clutch control device. Various other configuration can be employed for the clutch control device without departing from the spirit and scope of some of the embodiments discussed above.

The metes and bounds of some of the embodiments are defined only by the appended claims.

EXPLANATION OF THE REFERENCE NUMERALS

| 11 | ENGINE (POWER SOURCE) |
|---|---|
| 16, 16A | AMT |
| 25 | SHIFT CONTROL MOTOR |
| 36 | PRIMARY-DRIVEN-GEAR ROTATIONAL-SPEED SENSOR |
| | (INPUT SIDE ROTATIONAL SPEED DETECTOR) |
| 42 | VALVE |
| 42a | FIRST VALVE |
| 42b | SECOND VALVE |
| 26 | MAIN SHAFT |
| 26a | INNER MAIN SHAFT |
| 26b | OUTER MAIN SHAFT |
| 27 | COUNTER SHAFT |
| 65 | MAIN-SHAFT ROTATIONAL-SPEED SENSOR |
| | (OUTPUT SIDE ROTATIONAL SPEED DETECTOR) |
| 73 | INNER-MAIN-SHAFT ROTATIONAL-SPEED SENSOR |
| | (OUTPUT SIDE ROTATIONAL SPEED DETECTOR) |
| 74 | OUTER-MAIN-SHAFT ROTATIONAL-SPEED SENSOR |
| | (OUTPUT SIDE ROTATIONAL SPEED DETECTOR) |
| 75 | FIRST-CLUTCH-OIL-PRESSURE SENSOR |
| 76 | SECOND-CLUTCH-OIL-PRESSURE SENSOR |
| 100 | TRANSMISSION CONTROL UNIT |
| | (CLUTCH CONTROL UNIT) |
| 120 | ENGAGEMENT START DETECTOR |
| 110 | ENGAGEMENT-START CONTROL-AMOUNT DETECTOR |
| 130 | CLUTCH-CORRECTION-CONTROL-AMOUNT DERIVER |
| 140 | OIL PRESSURE-CLUTCH CONTROL CORRECTION AMOUNT DATA TABLE |
| 150 | CLUTCH-CONTROL-AMOUNT DETECTOR |
| CL | CLUTCH |
| CL1 | FIRST CLUTCH |
| CL2 | SECOND CLUTCH |
| M1-6 | FIRST TO SIXTH SPEED DRIVING GEAR |
| C1-6 | FIRST TO SIXTH SPEED DRIVEN GEAR |

We claim:

1. A clutch control device for a clutch, which connects and disconnects a rotational driving force transmitted to a drive wheel from a power source of a vehicle, the clutch includes an input side rotating body and an output side rotating body which synchronously rotate with the clutch being connected, the clutch control device comprising:
   input side rotational speed detection means for detecting a rotational speed of the input side rotating body;
   output side rotational speed detection means for detecting a rotational speed of the output side rotating body;
   clutch control means for controlling a control amount of the clutch;
   brake means for temporarily stopping the output side rotating body while the clutch is disconnected;
   clutch-control-amount detection means for detecting the control amount of the clutch;
   engagement start detection means for detecting an engagement start of the clutch when a rotational speed difference between the input side rotating body and the output side rotating body becomes equal to or less than a predetermined value;
   engagement-start control-amount detection means for detecting the control amount of the clutch in the engagement start; and
   clutch-correction-control-amount deriving means for deriving a correction control amount of the clutch based on the control amount of the clutch at the time when the engagement start is detected after the output side rotating body is temporarily stopped,
   wherein the clutch control means feedback-controls the control amount of the clutch based on the correction control amount.

2. The clutch control device according to claim 1, wherein the brake means for braking continuously for a predetermined period even after the output side rotating body is temporarily stopped.

3. The clutch control device according to claim 1, wherein the clutch is of a hydraulic type, and
   wherein the engagement-start control-amount detection means for deriving the control amount of the clutch based on an oil pressure generated in the clutch.

4. The clutch control device according to claim 1, wherein the clutch is of a hydraulic type driven by an oil pressure supplied from an oil pressure supply source,
   wherein the clutch control device further comprises an actuator means for controlling a flow rate of a hydraulic fluid supplied to the clutch, the actuator means is provided between the oil pressure supply source and the clutch, and
   wherein the engagement-start control-amount detection means for deriving the control amount of the clutch based on a drive current value of the actuator.

5. The clutch control device according to claim 1, further comprising:
   staged transmission means for transmitting the rotational driving force to the drive wheel with a predetermined gear ratio,
   wherein the clutch is a twin clutch including a first clutch and a second clutch, and is configured so that a connecting-and-disconnecting state of the twin clutch may be switched alternatively for every shifting operation of the staged transmission,
   wherein the staged transmission means for switching a gear on a side where the rotational driving force is not transmitted into a neutral state, among an odd numbered speed gear and an even numbered speed gear, by disconnecting any one of the first clutch and the second clutch, and
   wherein the engagement start detection means for detecting the engagement start with respect to the disconnected side of any of the first clutch and the second clutch.

6. The clutch control device according to claim 1, wherein the engagement start detection means for detecting the engagement start at every predetermined cycle.

7. The clutch control device according to claim 1, wherein the clutch-correction-control-amount deriving means for deriving the correction control amount based on a data table which specifies in advance a relation between the control amount of the clutch and the correction control amount at the time when the engagement start is detected.

8. The clutch control device according to claim 1, wherein the clutch control means for controlling the control amount of the clutch includes a warning means for warning that the control amount of the clutch, at the time when the engagement start is detected, exceeds a predetermined value.

9. A clutch control apparatus for a clutch, which connects and disconnects a rotational driving force transmitted to a drive wheel from a power source of a vehicle, the clutch includes an input side rotating body and an output side rotating body which synchronously rotate with the clutch being connected, the clutch control apparatus comprising:

an input side rotational speed detector configured to detect a rotational speed of the input side rotating body;

an output side rotational speed detector configured to detect a rotational speed of the output side rotating body;

a clutch control unit configured to control a control amount of the clutch;

a brake configured to temporarily stop the output side rotating body while the clutch is disconnected;

a clutch-control-amount detector configured to detect the control amount of the clutch;

an engagement start detector configured to detect an engagement start of the clutch when a rotational speed difference between the input side rotating body and the output side rotating body becomes equal to or less than a predetermined value;

an engagement-start control-amount detector configured to detect the control amount of the clutch in the engagement start; and a clutch-correction-control-amount deriver configured to derive a correction control amount of the clutch based on the control amount of the clutch at the time when the engagement start is detected after the output side rotating body is temporarily stopped, wherein the clutch control unit feedback-controls the control amount of the clutch based on the correction control amount.

10. The clutch control apparatus according to claim 9, wherein the brake continues to brake for a predetermined period even after the output side rotating body is temporarily stopped.

11. The clutch control apparatus according to claim 9, wherein the clutch is of a hydraulic type, and
wherein the engagement-start control-amount detector derives the control amount of the clutch based on an oil pressure generated in the clutch.

12. The clutch control apparatus according to claim 9, wherein the clutch is of a hydraulic type driven by an oil pressure supplied from an oil pressure supply source,
wherein the clutch control apparatus further comprises an actuator to control a flow rate of a hydraulic fluid supplied to the clutch, the actuator is provided between the oil pressure supply source and the clutch, and
wherein the engagement-start control-amount detector derives the control amount of the clutch based on a drive current value of the actuator.

13. The clutch control apparatus according to claim 9, further comprising a staged transmission unit to transmit the rotational driving force to the drive wheel with a predetermined gear ratio,
wherein the clutch comprises a twin clutch including a first clutch and a second clutch, and is configured so that a connecting-and-disconnecting state of the twin clutch may be switched alternatively for every shifting operation of the staged transmission,
wherein the staged transmission unit is configured to switch a gear on a side where the rotational driving force is not transmitted into a neutral state, among an odd numbered speed gear and an even numbered speed gear, by disconnecting any one of the first clutch and the second clutch, and
wherein the engagement start detector detects the engagement start with respect to the disconnected side of any of the first clutch and the second clutch.

14. The clutch control apparatus according to claim 9, wherein the engagement start detector detects the engagement start at every predetermined cycle.

15. The clutch control apparatus according to claim 9, wherein the clutch-correction-control-amount deriver derives the correction control amount based on a data table which specifies in advance a relation between the control amount of the clutch and the correction control amount at the time when the engagement start is detected.

16. The clutch control apparatus according to claim 9, wherein the clutch control unit comprises a warning unit to warn that the control amount of the clutch, at the time when the engagement start is detected, exceeds a predetermined value.

17. A clutch control method for a clutch, which connects and disconnects a rotational driving force transmitted to a drive wheel from a power source of a vehicle, the clutch includes an input side rotating body and an output side rotating body which synchronously rotate with the clutch being connected, the clutch control method comprising:

detecting, at an input side rotational speed detector, a rotational speed of the input side rotating body;

detecting, at an output side rotational speed detector, a rotational speed of the output side rotating body;

controlling, by a clutch control unit, a control amount of the clutch;

temporarily stopping, using a brake, the output side rotating body while the clutch is disconnected;

detecting, at a clutch-control-amount detector, the control amount of the clutch;

detecting, at an engagement start detector, an engagement start of the clutch when a rotational speed difference between the input side rotating body and the output side rotating body becomes equal to or less than a predetermined value;

detecting, at an engagement-start control-amount detector, the control amount of the clutch in the engagement start;

deriving, at a clutch-correction-control-amount deriver, a correction control amount of the clutch based on the control amount of the clutch at the time when the engagement start is detected after the output side rotating body is temporarily stopped; and feedback-controlling, at the clutch control unit, the control amount of the clutch based on the correction control amount.

18. The clutch control method according to 17, further comprising:
continuously braking, using the brake, for a predetermined period even after the output side rotating body is temporarily stopped.

19. The clutch control method according to claim 17, wherein the clutch is of a hydraulic type, and
wherein the deriving, at engagement-start control-amount detector, the control amount of the clutch is based on an oil pressure generated in the clutch.

20. The clutch control method according to claim 17, further comprising:
driving the clutch, which is of a hydraulic type, by an oil pressure supplied from an oil pressure supply source; and
controlling, by an actuator, a flow rate of a hydraulic fluid supplied to the clutch, the actuator is provided between the oil pressure supply source and the clutch,
wherein the deriving, at the engagement-start control-amount detector, the control amount of the clutch is based on a drive current value of the actuator.

21. The clutch control method according to claim 17, further comprising
- transmitting, using a staged transmission unit, the rotational driving force to the drive wheel with a predetermined gear ratio;
- configuring the clutch to be a twin clutch, which includes a first clutch and a second clutch, so that a connecting-and-disconnecting state of the twin clutch may be switched alternatively for every shifting operation of the staged transmission;
- switching, by the staged transmission unit, a gear on a side where the rotational driving force is not transmitted into a neutral state, among an odd numbered speed gear and an even numbered speed gear, by disconnecting any one of the first clutch and the second clutch; and
- detecting, at the engagement start detector, the engagement start with respect to the disconnected side of any of the first clutch and the second clutch.

22. The clutch control method according to claim 17, wherein the detecting, at engagement start detector, the engagement start at every predetermined cycle.

23. The clutch control method according to claim 17, wherein the deriving, at clutch-correction-control-amount deriver, the correction control amount is based on a data table which specifies in advance a relation between the control amount of the clutch and the correction control amount at the time when the engagement start is detected.

24. The clutch control method according to claim 17, further comprising:
- providing a warning unit, at a clutch control unit, to warn that the control amount of the clutch, at the time when the engagement start is detected, exceeds a predetermined value.

* * * * *